(12) United States Patent
Mosteller (10) Patent No.: US 10,095,572 B2
(45) Date of Patent: Oct. 9, 2018

(54) SYSTEM AND METHOD FOR PROVIDING IC CHIP CARDS

(71) Applicant: CPI Card Group—Colorado, Inc., Littleton, CO (US)

(72) Inventor: Barry Mosteller, Castle Pines, CO (US)

(73) Assignee: CPI CARD GROUP—COLORADO, INC., Littleton, CO (US)

( * ) Notice: Subject to any disclaimer, the term of this patent is extended or adjusted under 35 U.S.C. 154(b) by 1 day.

(21) Appl. No.: 15/521,526

(22) PCT Filed: Dec. 16, 2016

(86) PCT No.: PCT/US2016/067263
§ 371 (c)(1),
(2) Date: Apr. 24, 2017

(87) PCT Pub. No.: WO2017/106707
PCT Pub. Date: Jun. 22, 2017

(65) Prior Publication Data
US 2017/0315857 A1    Nov. 2, 2017

Related U.S. Application Data

(60) Provisional application No. 62/269,661, filed on Dec. 18, 2015.

(51) Int. Cl.
G06F 7/02    (2006.01)
G06F 11/07   (2006.01)
G06K 19/07   (2006.01)

(52) U.S. Cl.
CPC ........ *G06F 11/079* (2013.01); *G06F 11/0736* (2013.01); *G06F 11/0751* (2013.01); *G06F 11/0772* (2013.01); *G06K 19/07* (2013.01)

(58) Field of Classification Search
CPC .............. G06F 11/079; G06F 11/0736; G06F 11/0751; G06F 11/0772; G06K 19/07
See application file for complete search history.

(56) References Cited

U.S. PATENT DOCUMENTS

| | | | |
|---|---|---|---|
| 6,367,011 B1 * | 4/2002 | Lee | G06F 21/77 380/255 |
| 6,402,028 B1 | 6/2002 | Graham, Jr. et al. | |
| 6,588,673 B1 * | 7/2003 | Chan | G06K 19/077 235/379 |
| 7,962,713 B2 * | 6/2011 | Okaue | G06F 21/6209 711/163 |
| 8,196,131 B1 | 6/2012 | von Behren et al. | |
| 2002/0040936 A1 | 4/2002 | Wentker et al. | |

(Continued)

*Primary Examiner* — Guy Lamarre
(74) *Attorney, Agent, or Firm* — Marsh Fischmann & Breyfogle LLP; Thomas R. Marsh (57) ABSTRACT

A method and system are disclosed for providing integrated circuit chip cards (e.g. transaction cards) pursuant to an order placed by or on behalf of a card issuer wherein a testing data file is provided in conjunction with prepersonalization data encoding for use in conjunction with subsequent testing of the accuracy of the encoded prepersonalization data. Such testing may be completed prior to personalization data encoding to facilitate the identification of prepersonalization data encoding errors, thereby further facilitating remedial action and reduction of production disruptions.

23 Claims, 2 Drawing Sheets

(56) References Cited

U.S. PATENT DOCUMENTS

| | | |
|---|---|---|
| 2007/0095927 A1 | 5/2007 | Pesonen |
| 2009/0236414 A1* | 9/2009 | Finkenzeller .... G06K 19/07716 235/380 |
| 2014/0052630 A1 | 2/2014 | Bona et al. |

\* cited by examiner

SYSTEM AND METHOD FOR PROVIDING IC CHIP CARDS

RELATED APPLICATIONS

This application claims the priority benefit of U.S. Provisional Patent Application No. 62/269,661 filed Dec. 18, 2015, entitled "IMPROVED SYSTEM AND METHOD FOR PROVIDING IC CHIP CARDS," which application is incorporated herein by reference in its entirety.

BACKGROUND

Integrated circuit (IC) chip cards are increasingly utilized as transaction cards for payment in conjunction with a given transaction (e.g. credit cards, debit cards, stored-value cards). In turn, card issuer payment institutions issue IC chip transaction cards that each have a corresponding specific payment account administered by or on behalf of the card issuer. By way of primary example, banks issue IC chip transaction cards to customers having payment accounts administered by the banks.

In conjunction with the provision of IC chip transaction cards, IC chip modules are typically provided to a card fabricator that incorporates the IC chip modules in to IC chip cards. In turn, various types of data may be encoded into the IC chip modules of the IC chip cards, including account-specific data corresponding with a payment account administered by a card issuer of a given IC chip card (i.e. "personalization data"), and other non-account specific data pertaining to other attributes of the given IC chip card (i.e. "prepersonalization data").

In some arrangements, prepersonalization data encoding of IC chip cards may be completed by an IC chip card fabricator or other service provider prior to delivery of the IC chip cards to a card issuer or designee thereof, wherein after delivery the card issuer or designee thereof completes personalization data encoding. In turn, in the event that an error occurs during prepersonalization data encoding, such error may not be discovered until subsequent personalization data encoding, thereby resulting in undesired card production disruption to the card issuer or designee thereof.

SUMMARY

System and method embodiments disclosed herein are intended to reduce IC chip card production disruptions resulting from prepersonalization encoding errors, thereby yielding an improved approach for the provision IC chip cards, and in particular, IC chip transaction cards.

In one embodiment, a method for providing a plurality of integrated circuit (IC) chip cards, pursuant to an order placed by or on behalf of a card issuer, includes powering separately an IC chip module of each of the IC chip cards, and utilizing a first transport key identifier to obtain corresponding first transport key data that is stored separately (e.g. at a secure server) and that is also encoded in one of a plurality of data storage containers of a memory portion of the IC chip module of each of the plurality of IC chip cards. In turn, the embodiment may include separately unlocking the plurality of IC chip cards by presenting the obtained first transport key data to said one of the plurality of data storage containers of the IC chip module of each of the plurality of IC chip cards. As may be appreciated, said one of a plurality of data storage containers may function as a gate-keeper container for key data utilized for authentication and attendant unlocking of additional ones of the plurality of data storage containers for read and/or write operations.

Method embodiments may further include employing a second transport key identifier to obtain corresponding second transport key data that is stored separately (e.g. at a secure server), and encoding separately the second transport key data in said one of the plurality of data storage containers (e.g. the gate-keeper container) of the IC chip module of each of the plurality of IC chip cards after the unlocking, by overwriting the first transport key data. In turn, the method may include terminating separately the powering of the IC chip module of each of the plurality of IC chip cards, wherein the plurality of IC chip cards are automatically relocked.

For each of the plurality of IC chip cards the one or more additional data storage containers may comprise: a container for status data indicative of a card life cycle state, and a container for data indicative of card production life cycle information. Further, in some arrangements, such one or more additional data storage containers may comprise one or more of the following: at least one container for data specified by the card issuer or designee thereof; a container for data indicative of IC chip module-related information; a container for data indicative of IC chip card fabrication-related information; a container for data indicative of IC chip module personalization-related information; and a container for data indicative of an IC chip module application. In turn, in some embodiments the encoding may further comprise encoding separately data in to at least one of the container for status data indicative of a card life cycle state and the at least one container for data specified by the card issuer or designee thereof, for each of the plurality of IC chip cards. In contemplated arrangements, the first transport key identifier may be uniquely associated with the first transport key data, wherein use of the first transport key identifier may be required to access/obtain the first transport key data in certain storage arrangements (e.g. at a secure server or other secure storage device). Similarly, the second transport key identifier may be uniquely associated with the second transport key data, wherein use of the second transport key identifier may be required to access/obtain the second transport key data in certain storage arrangements (e.g. at a secure server or other secure storage device).

Method embodiments may further include providing the plurality of IC chip cards for transport to the card issuer or a designee thereof for testing to determine the accuracy of data encoded in one or more additional data storage containers of the plurality of data storage containers of the IC module of one or more samples of the plurality of IC chip cards in relation to an intended prepersonalization data set. In the later regard, method embodiments may include supplying a data file comprising the intended prepersonalization data set to the card issuer or designee thereof, in corresponding relation to the order for the plurality of IC chip cards, for use in testing the sample IC chip cards, wherein the intended prepersonalization data set includes the second transport key identifier and data indicative of IC chip-related information (e.g. IC chip manufacturer, IC chip product number, IC chip serial number and other chip-related information). In some embodiments, the intended prepersonalization data set included in the supplied data file may further include status data indicative of card life cycle state, and data indicative of card production life cycle information. Further, the intended prepersonalization data set may include data specified by the card issuer or designee thereof.

In contemplated implementations, the powering, utilizing, unlocking, employing, encoding, terminating, providing, and supplying steps noted above may be completed after fabrication and prior to personalization of the plurality of IC chip cards. For example, the powering, utilizing, unlocking, employing, encoding and terminating steps may be completed as a part of prepersonalization of the plurality of IC chip cards. In some embodiments, the powering, unlocking, encoding and terminating steps noted above may be completed utilizing a prepersonalization encoding device to interface separately with the IC chip module of each of the plurality of IC chip cards. For example, for a given one of the plurality of IC chip cards, such steps may be completed utilizing a single prepersonalization encoding device. Further, such steps as well as the utilizing, employing, providing and supplying steps may be completed at a location operated by a fabricator of the plurality of the IC chip cards or a third-party service provider.

In contemplated arrangements, the method embodiment may further comprise providing a software module to the card issuer or designee thereof. By way of example, the software module may be provided by a fabricator of the plurality of the IC chip cards or a third-party service provider.

The software module may comprise programmed instructions executable to configure a computer processor to perform a further method step comprising testing separately the accuracy of the data encoded in the IC chip module of each of one or more samples of the plurality of IC chip cards by comparing the data encoded in said one or more additional data storage containers of the plurality of data storage containers of the IC chip module of the one or more samples of the plurality of IC chip cards to corresponding data included in the intended prepersonalization data set of the data file supplied to the card issuer or designee thereof.

Further, the software module may further comprise programmed instructions executable to configure a computer process to perform an additional method step comprising generating an output in response to the testing, wherein the output indicates the presence of a discrepancy between the data encoded in said one or more additional data storage containers of the plurality of data storage containers of the IC chip module of said one or more samples of the plurality of IC chip cards and the corresponding data included in the intended prepersonalization data set included in the data file. Further, the output may comprise error information identifying one or more specific discrepancies between the data encoded in said one or more additional data storage containers of the plurality of data storage containers of the IC chip module of the one or more samples of the plurality of IC chip cards and the corresponding data included in the prepersonalization data set of the data file.

In some arrangements, the software module may further comprise programmed instructions executable to configure a processor to perform an additional method step comprising appending the error information to the data file. In turn, the appended data file may be provided to the fabricator and/or prepersonalization service provider for the plurality of the IC chip cards to facilitate remedial action.

In some embodiments, after the transporting and prior to the testing, the method may further comprise powering separately the IC chip module of each of the one or more samples of the plurality of IC chip cards, and utilizing the second transport key identifier included in the prepersonalization data set of the data file to obtain the corresponding second transport key data as stored separately (e.g. at a secure server or other secure storage device). In turn, each of the one or more samples of the plurality of IC chip cards may be unlocked separately by presenting the obtained second transport key data to the IC chip module (e.g. presented to said one of the data storage containers) of each of said one or more samples of the plurality of IC chip cards. Further, the method include reading separately the data encoded in the one or more additional data storage containers of the plurality of data storage containers of the IC chip module of each of said one or more samples of the plurality of IC chip cards for use in said testing. In turn, after the testing, the method may further comprise terminating separately the powering of the IC chip module of each of said one or more samples of the plurality of IC chip cards, wherein said one or more samples of the plurality of IC chip cards are automatically relocked. As may be appreciated, the post-transport powering, unlocking, reading, testing and terminating may be completed after fabrication of the plurality of IC chip cards and prior to personalization thereof.

In some arrangements, the method may include using a testing device to interface separately with the IC chip module of each of said one or more samples of the plurality of IC chip cards in said powering, unlocking, reading, testing and terminating steps (i.e. following the transporting step). In some arrangements, the testing device may be supplied to the card issuer or designee thereof by a fabricator of the plurality of IC chip cards or a third-party service provider, wherein the testing device may be provided for operative use together with the software module at a facility operated and/or otherwise controlled by the card issuer or designee thereof.

In some embodiments after the testing, the method may further provide for personalization of the IC chip cards, including the steps of powering separately the IC chip module of each of the plurality of IC chip cards, utilizing the second transport key identifier included in the intended prepersonalization data set of said data file to further obtain the corresponding second transport key data as stored separately (e.g. at a secure server or other secure device), and unlocking separately each of the plurality of IC chip cards by presenting the further obtained second transport key data to the IC chip module of each of the plurality of IC chip cards. Further, after the unlocking, and as part of the personalization, the method may include encoding separately (1) issuer key data in said one of the plurality of data storage containers (e.g. the gate-keeper container) of the IC chip module of each of the plurality of IC chip cards by overwriting the second transport key data, and (2) personalization data in one or more predetermined ones of the plurality of data storage containers of the IC chip module of each of the plurality of IC chip cards. Additionally, the method may comprise terminating separately the powering of the IC chip module of each of the plurality of IC chip cards, wherein the plurality of IC chip cards are automatically relocked. In contemplated arrangements, the method may include using a personalization encoding device to separately interface with the IC chip modules of each of the plurality of IC chip cards in said powering, unlocking, encoding and terminating steps that are completed after said testing as part of the personalization of the plurality of IC chip cards.

In some embodiments, the method may further include, prior to said transporting, containing the plurality of IC chip cards in one or more containers, and applying one or more machine readable marking on each of the one or more containers. In that regard, the one or more machine readable markings may comprise data indicative of the corresponding order for the plurality of IC chip cards, and data indicative of one or more corresponding production resources associated with the prepersonalization encoding. In such implementations, after transporting the IC chip cards to a card issuer or designee thereof, the method may further comprise reading the one or more machine readable marking to associate the one or more container containing the plurality of IC chip cards with the data file for the corresponding order.

In some embodiments, the method may further comprise receiving an order data file from the card issuer or designee of the card issuer prior to said transporting, wherein the order data file is formatted in a manner corresponding with a predetermined format of the data file supplied to the card issuer or designee thereof. In that regard, the predetermined format may be determined by a fabricator of the plurality of IC chip cards or third-party service provider.

Additional features and advantages of the present invention will become apparent upon consideration of the description that follows.

DETAILED DESCRIPTION

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

Figure 1:
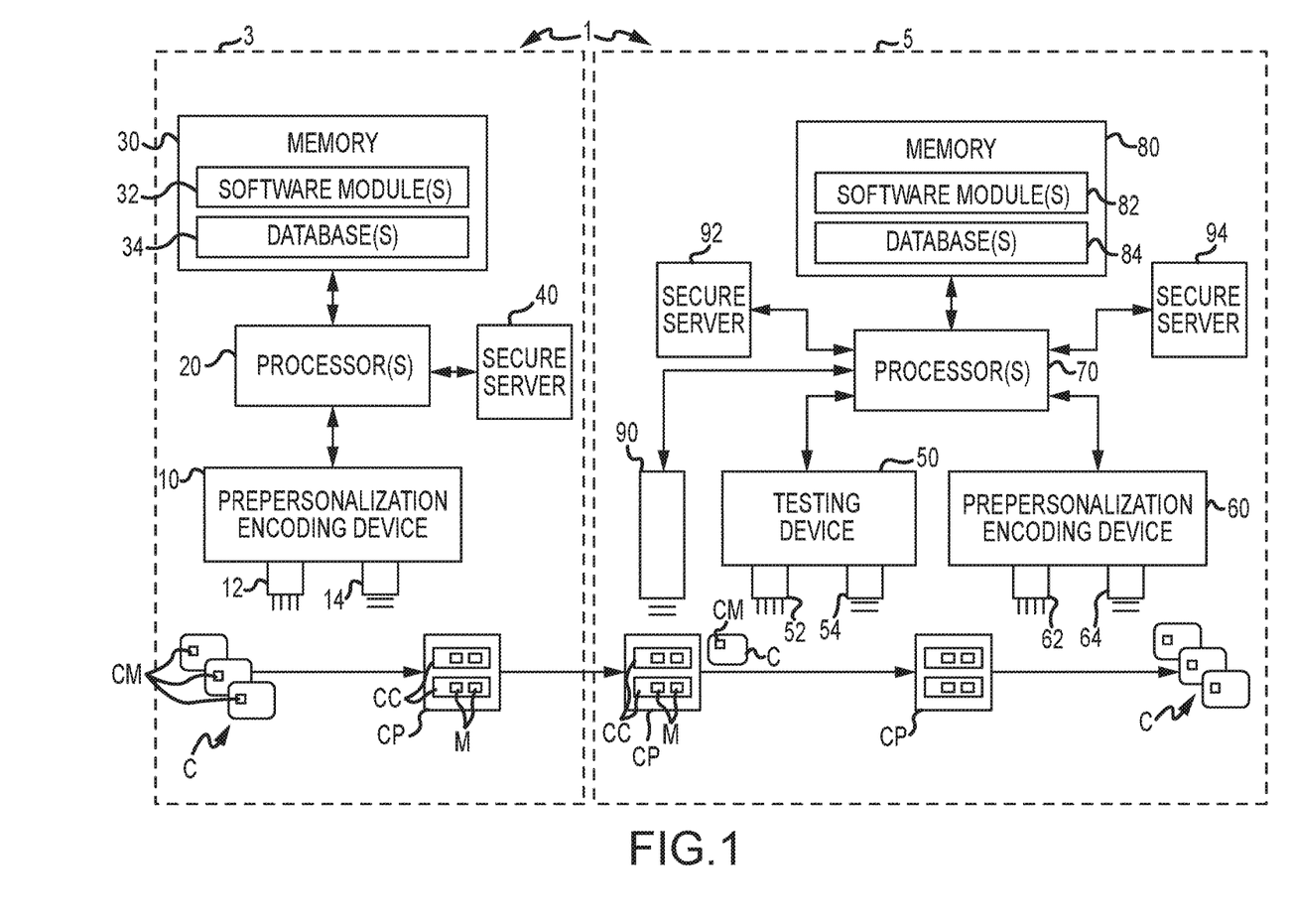
FIG. 1 illustrates an embodiment of a system for providing IC chip cards.

FIG. 1 illustrates one embodiment of a system for use in providing a plurality of integrated circuit (IC) chip cards, including IC chip transaction cards. More particularly, the system (1) is directed to post-fabrication handling of IC chip cards in a manner that reduces card production disruptions caused by prepersonalization data encoding errors.

As illustrated, the system (1) may include one or more prepersonalization encoding device(s) (10) and one or more processor(s) (20) for controlling the prepersonalization encoding device (10). In the later regard, processor (20) may be interconnected to memory (30) in which one or more software module(s) (32) and database(s) (34) are stored. In particular, a software module (32) may comprise an executable instruction set for configuring processor (20) to control operation of the prepersonalization encoding device (10) to encode IC chip cards utilizing data stored in a database (34). More particularly, the database (34) may include one or more data file(s), wherein each data file comprises an intended prepersonalization data set corresponding with a plurality of IC chip cards ordered by a given card issuer or designee of the card issuer. In contemplated implementations, the prepersonalization encoding device (10), processor (20) and memory (30) may be located at production facility (3) operated by an IC chip card fabricator and/or prepersonalization service provider.

In that regard, a plurality of fabricated IC chip cards C, each comprising an IC chip module CM, may be inserted in to the personalization encoding device (10) for encoding separately prepersonalization data into the IC chip modules CM. For such purposes, the personalization encoding device (10) may include a contact interface device (12) (e.g. an interface device having a plurality of pins locatable by camming action to engage contact pads provided on the IC chip cards for signal transmission to/from IC chip modules CM free from scratching the contact pads) and/or a non-contact interface device (14) (e.g. an interface device having a transceiver for wireless signal transmission to/from IC chip modules CM via an antenna or other non-contact coupling componentry included in the IC chip cards). As may be appreciated, upon insertion of the IC chip cards C into prepersonalization device (10), the contact interface (12) and/or non-contact interface device (14) may interface separately with the IC chip modules CM to provide operational power to the IC chip modules CM.

To initiate encoding at prepersonalization encoding device (10), for a given order of IC chip cards C, the processor (20) may be configured by software module (32) to utilize data comprising a corresponding data file stored in the database (34). In particular, the data file may include a first transport key identifier corresponding with first transport key data encoded in one of a plurality of data storage containers, e.g. a gate-keeper key container, of a memory portion of the IC chip modules CM of the IC chip cards C by the provider of the IC chip modules CM. The processor (20) may be configured to access a first secure server (40) to use the first transport key identifier to obtain first transport key data from the secure server (40), wherein the first transport key identifier is uniquely associated with the first transport key data. In turn, the processor (20) may control prepersonalization encoding device (10) to present separately the first transport key data to the IC chip module CM of each of the IC chip cards C to unlock the IC chip cards C. In that regard, the IC chip modules CM may be provided so that at least a portion of the data storage containers may not be read from or written to unless the IC chip modules CM are unlocked. As may be appreciated, the memory portion of each of the IC chip modules CM may be configured to define a plurality of data storage containers for storing different types of data.

The processor (20) may be further configured by software module (32) so that, after each given IC chip module has been unlocked, the prepersonalization encoding device (10) may be controlled to encode, or write, data in to one or more of the data storage containers of the memory of the IC chip module. In particular, the processor (20) may be configured by software module (32) to utilize a second transport key identifier included in the corresponding data file of database (34) to obtain corresponding second transport key data from the secure server (40), wherein the second transport key identifier is uniquely associated with the second transport key data. In that regard, if diversification is required, the processor (20) may be operable to interface with secure server (40) to generate different, unique data to comprise the second transport key data in relation to each of the IC chip cards C.

In turn, the prepersonalization encoding device (10) may be controlled to encode separately the second transport key data into said one of the plurality of data storage containers of each IC chip module CM by overwriting the first transport key data. Further, the prepersonalization encoding device (10) may be further controlled so as to encode separately data in one or more additional storage containers of each of the IC chip modules, including: a container for status data indicative of a card life cycle state; a container for data indicative of card production life cycle information (e.g. including IC chip-related information); at least one container for data specified by the card issuer or designee thereof; a container for data indicative of IC chip module-related information; a container for data indicative of IC chip card fabrication-related information; a container for data indicative of IC chip module personalization-related information; and/or a container for data indicative of an IC chip module application (e.g. an application loaded or otherwise embodied in the IC chip module). Correspondingly, the corresponding data file in database (34) may include any or all of the noted types of data for use in such encoding. After encoding, the IC chip cards C may be removed from prepersonalization device (10), whereupon power delivery to each of the IC chip module is terminated and IC chip cards are automatically relocked.

After encoding the IC chip cards C, the IC chip cards C may be contained in one or more card container(s) CC (e.g. one or more sleeve(s) for containing the IC chip cards C), wherein the card container(s) CC may be located in one or more card package(s) CP for transport to the card issuer or a designee thereof. Prior to such packaging, one or more machine readable markings M may be provided on each IC chip card container(s) (CC). By way of example, a first label bearing a first machine readable marking and a second label bearing a second machine readable marking may be attached to each chip card container(s) CC. The first machine readable marking may embody order identification data (e.g. IC chip manufacturer, IC chip product member, IC chip serial number, and other chip-related information), wherein such order identification data may be stored at one of the databases (34) in association with the data file corresponding with the given order. Further, the second machine readable marking may embody production identification data (e.g. identifying the prepersonalization encoding device, employed to encode the IC chip cards, the operator thereof, and the date/time of encoding), wherein such production identification data may be stored at one of the databases (34) in association with the data file corresponding with the given order. After packaging of the chip card container(s) CC in card package(s) CP, the card package(s) CP may be transported to the card issuer or designee thereof associated with the given order.

In conjunction with the provision of the IC chip cards C to the card issuer or designee thereof, a data file corresponding with a given order may also be provided. By way of example, a digital data file may be provided via e-mail, digital storage media, or any other appropriate modality for the provision of digital data. The data file may correspond with data included in the database (34). In particular, the data file provided to the card issuer or designee thereof may include an intended prepersonalization data set associated with the given order, and may include the corresponding second transport key identifier; diversification data indicative of whether second transport key data is required that comprises unique data for each different one of the IC chip modules of the plurality of IC chip cards; status data indicative of a card life cycle state data indicative of card production life cycle information (e.g. including data indicative of IC-chip related information); and other data specified by the card issuer or designee thereof.

As illustrated in FIG. 1, the card package(s) CP may be transported to a production facility controlled by the card issuer or designee thereof for the corresponding order. In turn, system embodiment (1) may further comprise a testing device (50), one or more personalization encoding device(s) (60), and one or more processor(s) (70) for controlling testing device (50) and personalization encoding device (60). In the later regard, processor(s) (70) may be interconnected to a memory (80) in which one or more software modules (82) and database(s) (84) are stored. By way of example, one database (84) may be utilized for storage of the data file received in relation to a given order for IC chip cards C. In that regard, such database (84) may be accessed by processor (70) in conjunction with associating, testing and personalization encoding of IC chip cards C received in connection with a given order.

In that regard, system embodiment (1) may further comprise a reading device (90) for reading the machine readable marking(s) M on the one or more card container(s) CC received in card packages CP. In turn, the machine readable marking data may be utilized by processor (70), and an associated software module (82), to associate the IC chip cards C contained in the chip card container(s) CC with the corresponding data file stored in database (84). In turn, the associated data file may be utilized by processor (70) and associated software module (82) for completing testing of the IC chip cards C associated with a given order.

Further, a testing software module (82) may comprise executable instructions for configuring the processor (70) to control operation of the testing device (50) for testing one or more sample(s) of the IC chip cards C. By way of example, the testing software module (82), and optionally the testing device (50), may be provided by the IC chip card fabricator and/or personalization service provider that performed the prepersonalization encoding described above. In some arrangements, a secure data server device (e.g. a Universal Serial Bus (USB) dongle or like device) may also be provided with the testing device (50) for use therewith, wherein the secure data server device may store the second transport key data for access utilizing the corresponding second transport key identifier discussed herein.

For testing purposes, the testing device (50) may include a contact interface device (52) (e.g. an interface device having a plurality of pins locatable by camming action to engage contact pads provided on the IC chip cards CC for signal transmission to/from IC module(s) CM free from scratching the contact pads) and/or a non-contact interface device (54) (e.g. an interface device having a transceiver for wireless signal transmission to/from IC module(s) CM via an antenna or other non-contact coupling componentry included in the IC chip cards CC) for reading data stored in the data storage containers of IC chip modules CM of the one or more sample(s) of the IC chip cards. As may be appreciated, upon insertion of each sample IC chip card C into testing device (50), the contact interface (52) and/or non-contact interface device (54) may interface with the corresponding IC chip modules CM to provide power to the IC chip module CM.

To initiate testing at testing device (50), i.e. for samples of the IC chip cards C received in relation to a given order, the processor(s) (70) may be configured by the testing software module (82) located at memory (80) to utilize comprising a corresponding data file stored in the database (84). In particular, the data file may correspond with the data file supplied to the card issuer or designee thereof, as discussed above, wherein such data file includes an intended prepersonalization data set associated with a given order, including the corresponding second transport key identifier noted above. In turn, the processor(s) (70) may be configured to access a second secure server (92) to use the second transport key identifier included in the data file to obtain the second transport key data from the second secure server (92). In that regard, the second transport key data may be separately provided in a secure manner to the card issuer or designee thereof. In an alternate arrangement, a secure data server device may also be provided with the testing device (50) for use therewith, wherein the secure data server device may store the second transport key data for restricted access utilizing the corresponding second transport key identifier, and wherein the processor may be configurable by testing software module (82) to access the secure data server device to access the second transport key data utilizing the second transport key identifier included in the data file.

In turn, the processor(s) (70) may control testing device (50) to present separately the second transport key data to the IC chip module CM of each of the one or more sample(s) of the IC chip cards C to unlock the sample IC chip card(s) C. In turn, the software module (82) may configure processor (70) to control the testing device (50) so as to read separately data from one or more of the data storage containers of the IC chip module CM of each of the one or more samples of the IC chip cards C, wherein the software module (82) may further configure the processor (70) to compare the read data with corresponding data included in the intended prepersonalization data set of the data file stored in the database (84). In that regard, the software module (82) may further comprise programmed instructions executable to configure the processor(s) (70) to provide an output in response to such testing, wherein the output may indicate the presence of a discrepancy between the read data (i.e. the data encoded in one or more of the data storage containers) and the corresponding data included in the corresponding intended prepersonalization data set.

The output may comprise error information identifying one or more specific discrepancies between the data encoded in one or more of the data storage containers and corresponding data included in the intended prepersonalization data set of the data file. Further, the software module (82) may include programmed instructions executable to configure the processor(s) (70) to append the error information to the data file. In turn, such appended data file may be provided to the supplier of the prepersonalized IC chip cards (e.g. an IC chip card fabricator and/or prepersonalization service provider as noted above). After testing at the testing device (50), the sample IC chip cards C may be removed from the testing device (50), whereupon power delivery is terminated and the sample IC chip cards C are relocked with the second transport key data encoded in the gate-keeper data storage container thereof.

In the event that the testing indicates one or more errors in the prepersonalization data encoded in the plurality of IC chip cards C, the IC chip cards C may be returned to the supplier of the IC chip cards C (e.g. the chip card fabricator or service provider who performed the prepersonalization encoding). Alternatively, if the testing failed to identify any errors in the encoded data, the IC chip cards C may proceed to personalization encoding or to inventory for subsequent personalization encoding by the card issuer or a designee thereof.

In turn, at the time of personalization encoding, the plurality of IC chip cards C may be provided to a personalization encoding device (60) comprising a contact interface device (62) and/or a non-contact interface device (64) for powering and unlocking (e.g. utilizing the second transport key identifier to obtain the second transport key data), and relocking the IC chip cards in a manner analogous to that described in relation to operation of the testing device (50). Further, the personalization encoding device (6) may be further controlled by processor(s) 70 to separately encode personalization data in predetermined ones of the plurality of storage containers of the IC chip module of each of the IC chip cards, wherein the personalization data is obtained via access to secure server 92 and/or via access to a separate secure server 94, and wherein card issuer key data may also be encoded in said one of the plurality of data storage containers (e.g. the gate-keeper container) of the IC chip module of each of the plurality of IC chip cards by over-writing the second transport key data prior to relocking.

Figure 2:
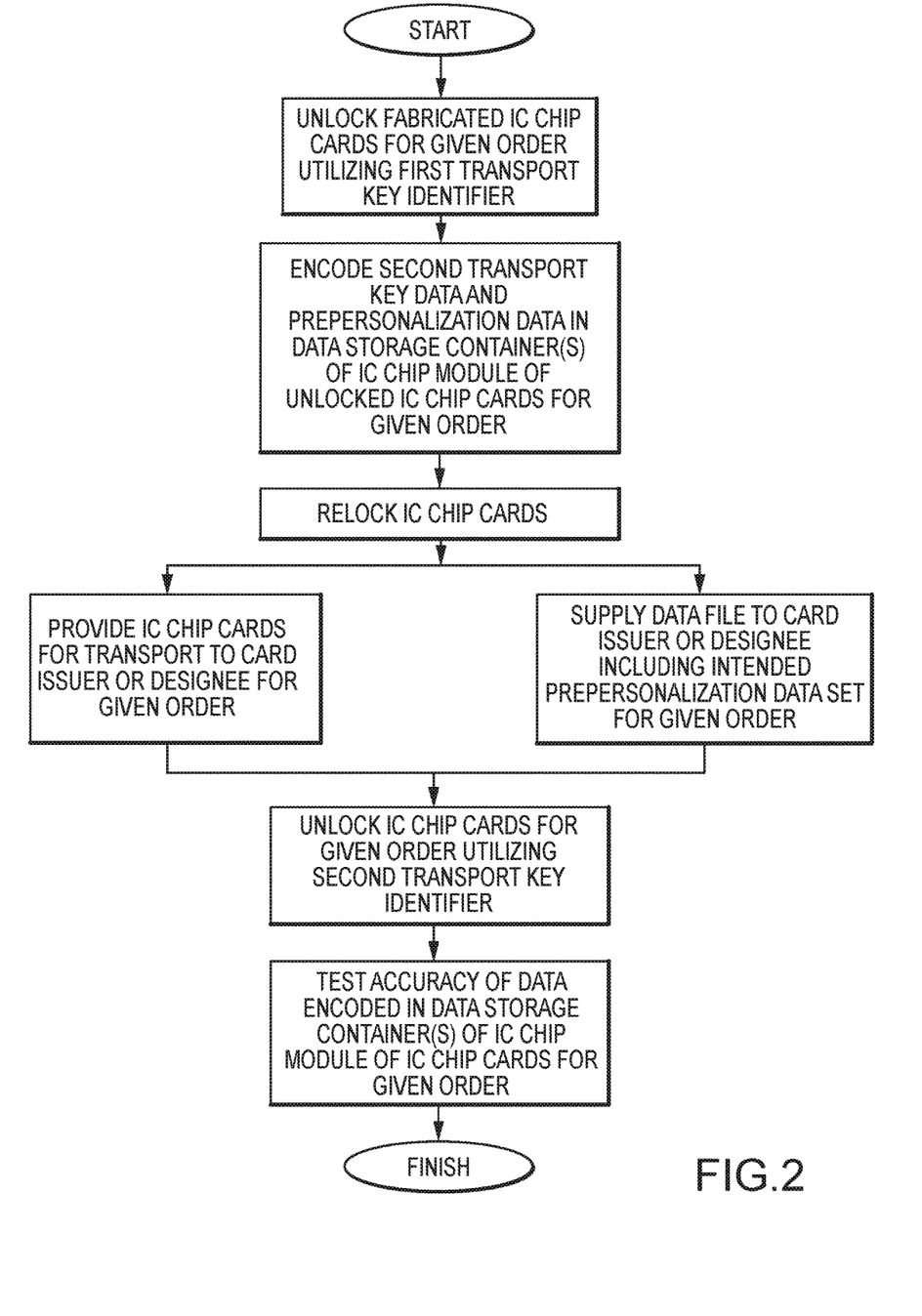
FIG. 2 illustrates one embodiment of a method for providing IC chip cards.

FIG. 6 illustrates one embodiment of a method for providing a plurality of IC chip cards C pursuant to an order placed by or on behalf of a card issuer, and reflects method steps otherwise described herein. In particular, the method may include unlocking fabricated IC chip cards C for a given order utilizing a first transport key identifier. In that regard, the first transport key identifier may be utilized to obtain first transport key data (e.g. from as secure server) that may be presented to the IC chip module CM of each of the IC chip cards C so as to unlock the IC chip cards C. In turn, data may be encoded in to one or more data storage containers of a memory portion of the IC chip module CM of each of the unlocked IC chip cards C. In particular, a second transport key identifier may be utilized to obtain second transport key data that is encoded in one of the data storage containers (e.g. the gate-keeper container), by overwriting the first transport key data. Further, prepersonalization data may be encoded in additional ones of the data storage containers.

After such encoding, the IC chip cards C may be relocked with the second transport key data encoded therein. In turn, the prepersonalized IC chip cards C may be provided for transport to the card issuer or designee thereof. In conjunction therewith, a data file may be supplied to the card issuer or a designee, wherein the data file includes an intended prepersonalization data set for the given order, including the second transport key identifier and other prepersonalization data encoded in one or more of the data storage containers, as discussed above. In turn, of the facility site of the recipient of the prepersonalized IC chip cards C, the data file may be accessed for use of the second transport key identifier to obtain the second transport key data (e.g. via use of a testing software module), the second transport key data may be utilized to unlock the IC chip cards C. Thereafter, the unlocked IC chip cards may be tested utilizing a testing software module to assess the accuracy of the prepersonalization data encoded in the data storage containers of the IC chip modules CM of one or more samples of the IC chip cards C. In conjunction with such testing, the encoded data may be read for comparison with corresponding intended data included in the corresponding intended prepersonalization data set of the data file provided to the card issuer or designee thereof. In the event that an error is detected, the software module may operate to provide an output to indicate that an error was detected, and more particularly, an output comprising error information that identifies the specific nature of the detected error. In turn, the error information may be appended to the data set, and the appended data file may provide to the supplier of the IC chip cards, wherein the detected error may be addressed. Additional method features may be utilized in a method embodiment as described in relation to the system embodiment hereinabove and/or as otherwise taught herein.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only preferred embodiment and variants thereof have been shown and described and that all changes and modifications that come within the spirit of the invention are desired to be protected.

What is claimed is:

1. A method for providing a plurality of integrated circuit (IC) chip cards pursuant to an order placed by or on behalf of a card issuer, comprising:
   powering separately an IC chip module of each of the plurality of IC chip cards, wherein first transport key data is encoded in one of a plurality of data storage containers of a memory portion of the IC chip module of each of the plurality of IC chip cards;
   utilizing a first transport key identifier to obtain the first transport key data as stored separately;
   unlocking separately the plurality of IC chip cards by presenting the obtained first transport key data to the IC chip module of each of the plurality of IC chip cards;
   employing a second transport key identifier to obtain second transport key data;
   encoding separately the second transport key data in said one of the plurality of data storage containers of the IC chip module of each of the plurality of IC chip cards after the unlocking by overwriting said first transport key data;
   terminating separately said powering of the IC chip module of each of the plurality of IC chip cards, wherein said plurality of IC chip cards are automatically relocked;
   providing the plurality of IC chip cards, after said terminating, for transport to the card issuer or a designee thereof for testing to determine the accuracy of data encoded in one or more additional data storage containers of said plurality of data storage containers of the IC module of one or more of the plurality of IC chip cards in relation to an intended prepersonalization data set; and,
   supplying a data file comprising said intended prepersonalization data set to the card issuer or designee thereof, in corresponding relation to said order and said plurality of IC chip cards, for use in said testing, wherein said intended prepersonalization data set comprises:
      said second transport key identifier; and,
      data indicative of IC chip-related information;
   wherein said powering, utilizing, unlocking, employing, encoding, terminating, providing, and supplying are completed after fabrication and prior to personalization of the plurality of IC chip cards.

2. A method as recited in claim 1, further comprising:
   using a prepersonalization encoding device to interface separately with the IC chip module of each of the plurality of IC chip cards in said powering, unlocking, encoding and terminating steps.

3. A method as recited in claim 1, wherein for each of the plurality of IC chip cards said one or more additional data storage containers comprise:
   a container for status data indicative of a card life cycle state; and,
   a container for data indicative of card production life cycle information.

4. A method as recited in claim 3, wherein for each of the plurality of IC chip cards said one or more additional data storage containers further comprise one or more of the following:
   at least one container for data specified by the card issuer or designee thereof;
   a container for data indicative of IC chip module-related information;
   a container for data indicative of IC chip card fabrication-related information;
   a container for data indicative of IC chip module personalization-related information; and,
   a container for data indicative of an IC chip module application.

5. A method as recited in claim 4, wherein said encoding further comprises:
   encoding separately data in to at least one of said container for status data indicative of a card life cycle state, and said at least one container for data specified by the card issuer or designee thereof, for each of the plurality of IC chip cards.

6. A method as recited in claim 3, wherein the intended prepersonalization data set further comprises:
   status data indicative of a card life cycle state; and,
   data indicative of card production life cycle information.

7. A method as recited in claim 1, further comprising:
   providing a software module.

8. A method as recited in claim 7, wherein the software module comprises programmed instructions executable to configure a computer processor to perform a further method step comprising:
   testing separately the accuracy of data encoded in the IC chip module of each of one or more samples of the plurality of IC chip cards by comparing the data encoded in said one or more additional data storage containers of the plurality of data storage containers of the IC chip module of said one or more samples of the plurality of IC chip cards to corresponding data included in the intended prepersonalization data set of said data file.

9. A method as recited in claim 8, wherein the software module further comprises programmed instructions executable to configure a computer processor to perform a further method step comprising:
   generating an output in response to said testing, wherein said output indicates the presence of a discrepancy between the data encoded in said one or more additional data storage containers of the plurality of data storage containers of the IC chip module of said one or more samples of the plurality of IC chip cards and the corresponding data included in the intended prepersonalization data set included in said data file.

10. A method as recited in claim 9, wherein said output comprises error information identifying one or more specific discrepancies between the data encoded in said one or more additional data storage containers of the plurality of data storage containers of the IC chip module of the one or more samples of the plurality of IC chip cards and the corresponding data included in the intended prepersonalization data set of said data file.

11. A method as recited in claim 10, wherein the software module further comprises programmed instructions executable to configure a computer processor to perform a further method step comprising:
   appending the error information to said data file.

12. A method as recited in claim 9, wherein in said providing the software module is provided to the card issuer or designee of the card issuer, and wherein prior to said testing, the method further comprises:
   transporting the plurality of IC chip cards to said card issuer or the designee of the card issuer, wherein said testing and generating are performed after the transporting.

13. A method as recited in claim 12, wherein after said transporting and prior to said testing the method further comprises:

powering separately the IC chip module of each of said one or more samples of the plurality of IC chip cards;

utilizing the second transport key identifier included in said prepersonalization data set of said data file to obtain said corresponding second transport key data as stored separately;

unlocking separately each of said one or more samples of the plurality of IC chip cards by presenting said obtained second transport key data to the IC chip module of each of said one or more samples of the plurality of IC chip cards; and, reading separately said data encoded in said one or more additional data storage containers of the plurality of data storage containers of the IC chip module of each of said one or more samples of the plurality of IC chip cards for use in said testing.

14. A method as recited in claim 13, wherein after said testing the method further comprises:

terminating separately said powering of the IC chip module of each of said one or more samples of the plurality of IC chip cards, wherein said one or more samples of the plurality of IC chip cards are automatically relocked, and wherein said powering, unlocking, reading, testing and terminating are completed after fabrication and said transporting of the plurality of IC chip cards and prior to personalization thereof.

15. A method as recited in claim 14, further comprising:

using a testing device to interface separately with the IC chip module of each of said one or more samples of the plurality of IC chip cards in said powering, unlocking, reading, testing and terminating after said transporting, wherein said testing device is provided for operative use with said software module.

16. A method as recited in claim 14, wherein after said testing the method further comprises:

powering separately the IC chip module of each of the plurality of IC chip cards;

utilizing the second transport key identifier included in said intended prepersonalization data set of said data file to further obtain said corresponding second transport key data as stored separately; and, unlocking separately said plurality of IC chip cards by presenting said further obtained second transport key data to the IC chip module of each of the plurality of IC chip cards;

encoding separately: issuer key data in said one of the plurality of data storage containers of the IC chip module of each of the IC chip cards by overwriting the second transport key data, and personalization data in one or more predetermined ones of the plurality of data storage containers of the IC chip module of each of the plurality of the IC chip cards; and, terminating separately said powering of the IC chip module of each of the plurality of IC chip cards, wherein said plurality of IC chip cards are automatically relocked.

17. A method as recited in claim 16, further comprising:

using a personalization encoding device to interface separately with the IC chip module of each of the plurality of the IC chip cards in said powering, unlocking, encoding and terminating steps of claim 16.

18. A method as recited in claim 12, wherein prior to said transporting, the method further comprises:

containing the plurality of IC chip cards in one or more container; and, providing one or more machine readable marking on each of said one or more container, wherein said one or more machine readable marking comprises:

order data indicative of the corresponding order for the plurality of IC chip cards; and, data indicative of one or more corresponding production resources associated with completion of said encoding.

19. A method as recited in claim 18, wherein after said transporting, said method further comprises:

reading said one or more machine readable marking to associate said one or more container with said data file for the corresponding order.

20. A method as recited in claim 12, further comprising:

receiving an order data file from the card issuer or designee of the card issuer, wherein the order data file is formatted in a manner corresponding with a predetermined format of the data file.

21. A method as recited in claim 1, wherein said first transport key identifier is uniquely associated with said first transport key data, and wherein said second transport key identifier is uniquely associated with said second transport key data.

22. A method for providing a plurality of integrated circuit (IC) chip cards pursuant to an order placed by or on behalf of a card issuer, comprising:

powering separately an IC chip module of each of the plurality of IC chip cards, wherein first transport key data is encoded in one of a plurality of data storage containers of a memory portion of the IC chip module of each of the plurality of IC chip cards;

utilizing a first transport key identifier to obtain the first transport key data as stored separately;

unlocking separately the plurality of IC chip cards by presenting the obtained first transport key data to the IC chip module of each of the plurality of IC chip cards;

employing a second transport key identifier to obtain second transport key data;

encoding separately the second transport key data in said one of the plurality of data storage containers of the IC chip module of each of the plurality of IC chip cards after the unlocking by overwriting said first transport key data;

terminating separately said powering of the IC chip module of each of the plurality of IC chip cards, wherein said plurality of IC chip cards are automatically relocked;

providing the plurality of IC chip cards, after said terminating, for transport to the card issuer or a designee thereof for testing to determine the accuracy of data encoded in one or more additional data storage containers of said plurality of data storage containers of the IC module of one or more of the plurality of IC chip cards in relation to an intended prepersonalization data set;

supplying a data file comprising said intended prepersonalization data set to the card issuer or designee thereof, in corresponding relation to said order and said plurality of IC chip cards, for use in said testing, wherein said intended prepersonalization data set comprises:

said second transport key identifier; and, data indicative of IC chip-related information;

wherein said powering, utilizing, unlocking, employing, encoding, terminating, providing, and supplying are completed after fabrication and prior to personalization of the plurality of IC chip cards; and, providing a software module to the card issuer or designee of the card issuer, wherein the software module comprises programmed instructions executable to configure a computer processor to perform further method steps comprising:
  testing separately the accuracy of data encoded in the IC chip module of each of one or more samples of the plurality of IC chip cards by comparing the data encoded in said one or more additional data storage containers of the plurality of data storage containers of the IC chip module of said one or more samples of the plurality of IC chip cards to corresponding data included in the intended prepersonalization data set of said data file; and,
  generating an output in response to said testing, wherein said output indicates the presence of a discrepancy between the data encoded in said one or more additional data storage containers of the plurality of data storage containers of the IC chip module of said one or more samples of the plurality of IC chip cards and the corresponding data included in the intended prepersonalization data set included in said data file, wherein said output comprises error information identifying one or more specific discrepancies between the data encoded in said one or more additional data storage containers of the plurality of data storage containers of the IC chip module of the one or more samples of the plurality of IC chip cards and the corresponding data included in the intended prepersonalization data set of said data file.

23. A method for providing a plurality of integrated circuit (IC) chip cards pursuant to an order placed by or on behalf of a card issuer, comprising:
  powering separately an IC chip module of each of the plurality of IC chip cards, wherein first transport key data is encoded in one of a plurality of data storage containers of a memory portion of the IC chip module of each of the plurality of IC chip cards;
  utilizing a first transport key identifier to obtain the first transport key data as stored separately;
  unlocking separately the plurality of IC chip cards by presenting the obtained first transport key data to the IC chip module of each of the plurality of IC chip cards;
  employing a second transport key identifier to obtain second transport key data;
  encoding separately the second transport key data in said one of the plurality of data storage containers of the IC chip module of each of the plurality of IC chip cards after the unlocking by overwriting said first transport key data;
  terminating separately said powering of the IC chip module of each of the plurality of IC chip cards, wherein said plurality of IC chip cards are automatically relocked;
  providing the plurality of IC chip cards, after said terminating, for transport to the card issuer or a designee thereof for testing to determine the accuracy of data encoded in one or more additional data storage containers of said plurality of data storage containers of the IC module of one or more of the plurality of IC chip cards in relation to an intended prepersonalization data set;
  supplying a data file comprising said intended prepersonalization data set to the card issuer or designee thereof, in corresponding relation to said order and said plurality of IC chip cards, for use in said testing, wherein said intended prepersonalization data set comprises:
    said second transport key identifier; and,
    data indicative of IC chip-related information;
  wherein said powering, utilizing, unlocking, employing, encoding, terminating, providing, and supplying are completed after fabrication and prior to personalization of the plurality of IC chip cards;
  providing a software module to the card issuer or designee of the card issuer, wherein the software module comprises programmed instructions executable to configure a computer processor to perform a further method step comprising:
    testing separately the accuracy of data encoded in the IC chip module of each of one or more samples of the plurality of IC chip cards by comparing the data encoded in said one or more additional data storage containers of the plurality of data storage containers of the IC chip module of said one or more samples of the plurality of IC chip cards to corresponding data included in the intended prepersonalization data set of said data file; and,
  wherein after said testing the method further comprises:
    powering separately the IC chip module of each of the plurality of IC chip cards;
    utilizing the second transport key identifier included in said intended prepersonalization data set of said data file to further obtain said corresponding second transport key data as stored separately; and,
    unlocking separately said plurality of IC chip cards by presenting said further obtained second transport key data to the IC chip module of each of the plurality of IC chip cards;
    encoding separately: issuer key data in said one of the plurality of data storage containers of the IC chip module of each of the IC chip cards by overwriting the second transport key data, and personalization data in one or more predetermined ones of the plurality of data storage containers of the IC chip module of each of the plurality of the IC chip cards; and,
    terminating separately said powering of the IC chip module of each of the plurality of IC chip cards, wherein said plurality of IC chip cards are automatically relocked.

* * * * *